F. L. ARBOGAST.
METHOD OF MANUFACTURING GLASSWARE.
APPLICATION FILED APR. 4, 1908.
905,044.
Patented Nov. 24, 1908.
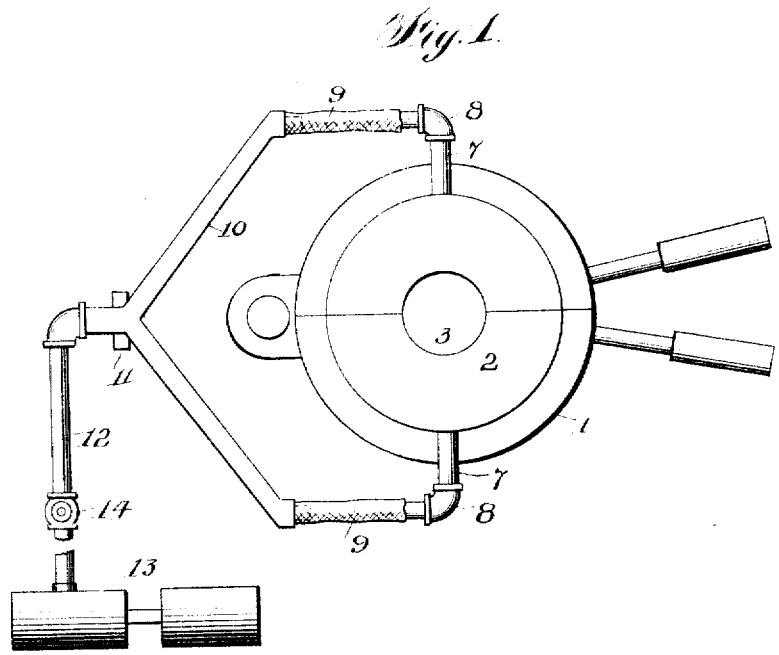
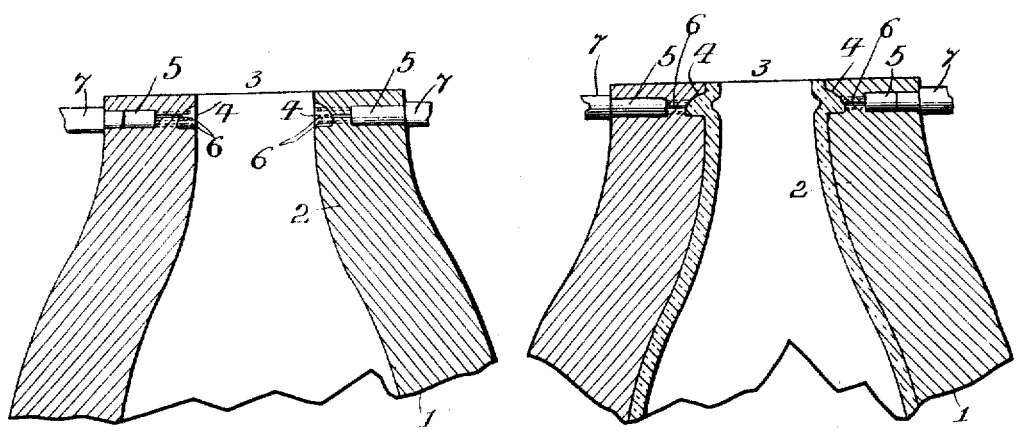

UNITED STATES PATENT OFFICE.

FREDERICK L. ARBOGAST, OF PITTSBURG, PENNSYLVANIA, ASSIGNOR OF ONE-HALF TO J. E. ROTH, OF PITTSBURG, PENNSYLVANIA.

METHOD OF MANUFACTURING GLASSWARE.

No. 905,044.

Specification of Letters Patent.

Patented Nov. 24, 1908.

Application filed April 4, 1908. Serial No. 425,178.

*To all whom it may concern:*

Be it known that I, FREDERICK L. ARBOGAST, a citizen of the United States, residing at Pittsburg, in the county of Allegheny and State of Pennsylvania, have invented certain new and useful Improvements in Methods of Manufacturing Glassware, of which the following is a specification.

This invention has relation to the manufacture of glass ware and particularly to the manufacture of hollow glass ware, such as bottles having laterally projecting studs on their necks, at or near their mouths for the attachment of caps or closures.

The object of the invention is to provide a novel method for the production of such studs as a finishing step after the completion of the neck and body of the bottle in a proper blow mold. The method contemplates and consists in producing the studs on the neck of the bottle, or on some other part of a bottle or other article by means of suction.

In carrying out my invention the gathering of glass to form the bottle is worked in the usual manner and placed in a suitable mold having at its neck portion near the mouth a plurality of wells or cavities of the size and shape of the studs to be produced. These cavities communicate through minute holes in the mold with larger holes leading to the exterior of the mold in which are inserted nipples connected to a hose leading from a suitable vacuum pump or suction creating apparatus.

When the soft glass is inserted in the mold and the body and neck molded or blown to shape a valve in the pipe leading from the suction apparatus is opened; immediately the air is sucked out of the cavities in the neck of the mold and the glass is forced into the cavities by the pressure of the air within the bottle. The projections being thus formed, the mold is opened and the bottle transferred to the finisher. This method can be used to produce projections on a bottle first completed in a separate mold, and the necks then reheated and inserted in a small mold or ring having the stud producing cavities. The method can also be used for forming projections on other articles than bottles, and on otherwise finished articles on which projections or studs are desired for the purpose of attaching metallic parts.

In the accompanying drawing illustrating apparatus for carrying my invention into effect: Figure 1 is a top plan view. Fig. 2 is a vertical sectional view of the mold without the bottle. Fig. 3 is a similar view of the mold with the bottle.

1 designates a two part bottle blow mold of the usual type having at the upper part of its neck portion 2, near the mouth 3, the small horizontal cavities 4 of any desired shape or size but preferably of a size and shape to form on the bottle neck studs suitable to hold a metallic closure cap having a depending flange with bayonet slots to interlock with the studs. Holes 5 are bored into the wall of the mold in line with the cavities 4, and communicate with the latter through the series of minute holes 6. In the holes 5 are fitted sections of tubing or nipples 7 each having connected to its outer end an elbow tube 8. To each elbow is attached a short section of flexible hose 9 and these are attached to a V tube 10, which is mounted for convenience on a tripod 11 or other support, and coupled to a pipe 12 leading from a pump 13 or other suction apparatus. To this pipe is fitted a suitable valve 14.

Having described my invention, I claim:

1. The method of forming projections on glass articles, consisting in inserting the soft glass in a suitable mold having lateral cavities corresponding to the projections to be produced and communicating with a suction apparatus and thereby molding a mass of glass and afterwards, and while the glass is soft creating a vacuum in said cavities.

2. The method of forming projections on the neck of a bottle consisting in blowing the body and neck of the bottle in a mold having cavities near its mouth, and then while the glass is soft creating a vacuum in the cavities whereby the glass will be forced into the cavities by atmospheric pressure.

In testimony whereof I have affixed my signature, in presence of two witnesses.

FREDERICK L. ARBOGAST.

Witnesses:
FRANK M. SANKEY,
THOMAS H. SANKEY.